S. H. PITKIN & F. MOELLER.
CLUTCH.
APPLICATION FILED SEPT. 21, 1910.
1,031,729.
Patented July 9, 1912.
2 SHEETS—SHEET 2.
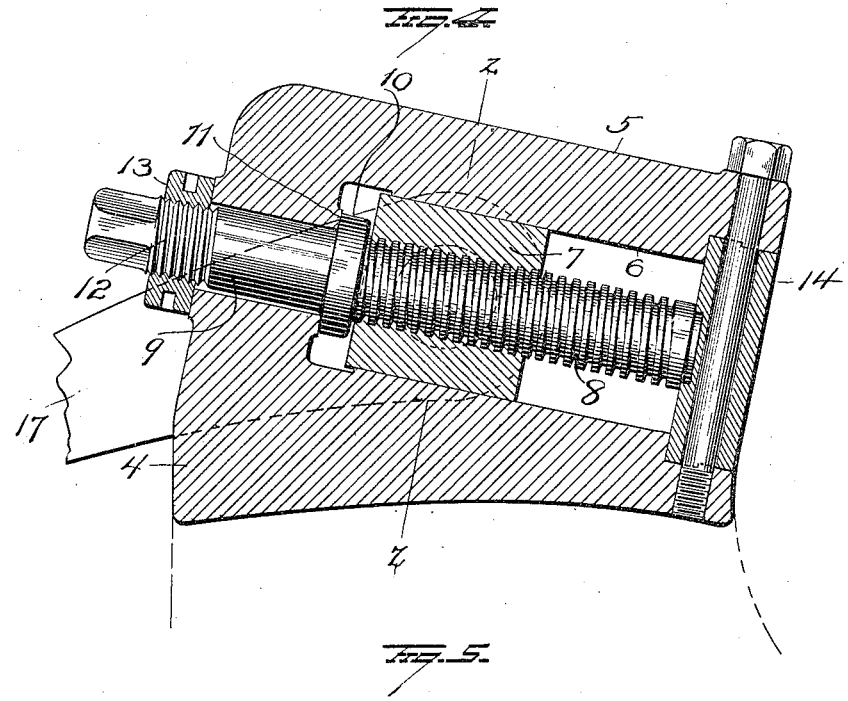
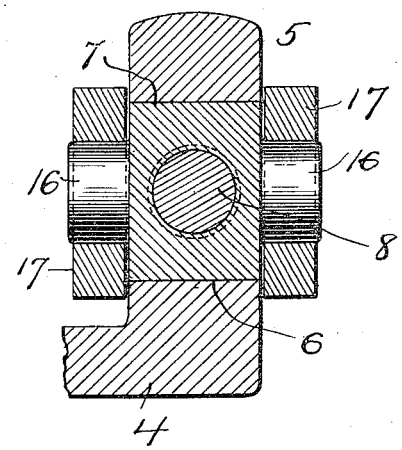
WITNESSES
E. J. Nottingham
G. F. Downing
INVENTORS
S. H. Pitkin
F. Moeller
By H. A. Seymour, Attorney

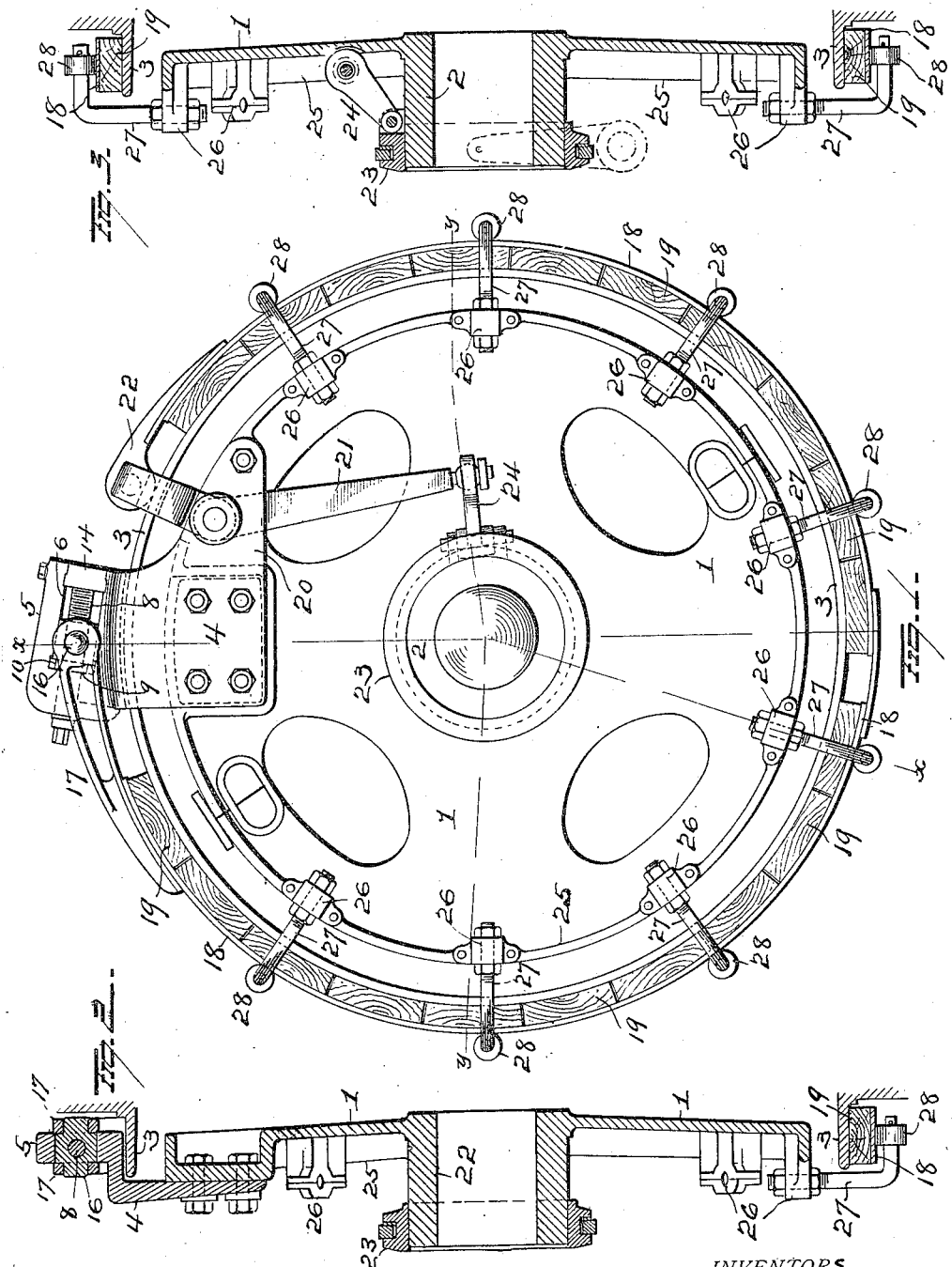

UNITED STATES PATENT OFFICE.

STEPHEN H. PITKIN, OF AKRON, AND FRANKLIN MOELLER, OF CLEVELAND, OHIO, ASSIGNORS TO THE WELLMAN-SEAVER-MORGAN COMPANY, OF CLEVELAND, OHIO.

CLUTCH.

1,031,729.  Specification of Letters Patent.  Patented July 9, 1912.

Application filed September 21, 1910. Serial No. 583,081.

*To all whom it may concern:*

Be it known that we, STEPHEN H. PITKIN and FRANKLIN MOELLER, of Akron and Cleveland, in the counties of Summit and Cuyahoga, respectively, and State of Ohio, have invented certain new and useful Improvements in Clutches; and we do hereby declare the following to be a full, clear, and exact description of the invention, such as will enable others skilled in the art to which it appertains to make and use the same.

This invention relates to improvements in clutch devices and more particularly to a combined clutch and machine brake,— one object of the invention being to so construct and arrange an adjustable connection for the fixed end of the clutch or brake band that the screw forming part of such connection will be in compression.

A further object is to so construct an adjustable connection for the fixed end of a clutch or brake band that, in case of breakage or stripping of the threads on the screw which forms part of said connection, the band will be held in such manner as to prevent it from interfering with other parts of the mechanism or causing damage.

A further object is to provide simple and efficient means for adjustably connecting one end of a clutch or brake band with a disk or support and for affording a mounting for the operating lever connected with the loose end of said band.

With these and other objects in view the invention consists in certain novel features of construction and combinations of parts as hereinafter set forth and pointed out in the claims.

In the accompanying drawings, Figure 1 is a face view illustrating our invention. Fig. 2 is a view in section on the line x—x of Fig. 1. Fig. 3 is an enlarged view partly in section showing the adjustable connecting devices for the fixed end of the clutch or brake band, Fig. 4 is a sectional view on the line y—y of Fig. 3, and Fig. 5 is a sectional view on the line z—z of Fig. 4.

1 represents a disk or spider provided with a hub 2 keyed to the shaft on which it is mounted, and 3 represents a brake wheel or pulley to be mounted loosely upon said shaft and to be connected with the latter by means of the clutch devices hereinafter described.

A bracket 4 is rigidly secured to the disk or support 1 and projects beyond the periphery thereof,—the free end of said bracket being so disposed as to overhang the engaging surface of the wheel or pulley 3, as clearly shown in Fig. 2. The head 5 of the bracket 4 which thus overhangs the wheel or pulley 3 is provided with an elongated slot or opening 6 in which a nut or block 7 is movable. The nut or block 7 is made with a threaded opening for the accommodation of the threaded portion 8 of a rod 9,—the plain portion of this rod being mounted in the rear portion of the head 5 of bracket 4 and between said plain portion and the threaded portion 8, the rod 9 is provided with a fixed collar 10 adapted to abut against an annular shoulder 11 at one end of the recess or slot 6 in the head 5. The rod 9 projects rearwardly beyond the head 5 and provided with a threaded portion 12 for the reception of a jam nut 13 and the free end of said rod is made angular for the reception of a suitable tool by means of which the rod can be turned for adjusting the position of the nut or block 7. The forward end of the slot 6 is closed by means of a block 14 in which the forward end of the rod 9 may be loosely mounted and this block is removably held in place by means of a bolt 15. By the provision of the removable block 14, ready access may be had for the removal of the threaded rod 9 and the nut or block 7. The nut or block 7 is provided at diametrically opposite sides with pintles 16 with which the bifurcated members of an arm 17 are pivotally connected. The arm 17 is rigidly secured to one end of a clutch or brake-band 18 encircling the peripheral engaging face of the wheel or pulley 3 and preferably carries a series of shoes 19 to make contact with said engaging face. The bracket 4 is provided with a lateral arm 20 which constitutes a support for a pivoted lever 21. With the short arm of this lever, and arm 22 is pivotally connected and said arm 22 is rigidly secured to the brake-band so that when the long arm of the lever 21 is moved in one direction, the brake or clutch band will be tightened on the wheel or pulley 3, and thus, through the medium of the disk 1 and its connections with the brake band, connect the wheel or pulley 3 with the shaft. A collar 23 is movable longitudinally on the hub 2 of the disk 1 by means of any suitable shifting device, and this collar is connected by means of a link 24, with the long arm of the lever 21 for operating the latter to apply or release the clutch or brake-band. The disk 1 is preferably provided with a laterally projecting peripheral flange 25 and at intervals this flange is provided with bosses 26 to which rods or arms 27 are connected. The rods or arms 27 are made L-shaped as shown in Fig. 2 so as to overhang the brake or clutch band and are provided at their free ends with small rollers 28 to engage said brake or clutch band and in this manner said band is prevented from displacement.

With the construction and arrangement of parts above described, the adjusting screw will be in compression instead of in tension as in prior constructions of which we are aware and if the threaded rod should break or the threads thereon become stripped, the bearing afforded by the collar 10 against the shoulder 11 will prevent the escape or dangerous displacement of the brake band and thus avoid damages to the mechanism such as would occur if the brake-band should become entirely detached from its connection with the disk or support 1.

Adjustment of the brake or clutch band for wear can be readily made by turning the threaded rod 9 to move the nut or block 7 with which the fixed end of said band is connected and accidental turning of said rod will be prevented by means of the jam nut 13.

The mounting of the threaded rod 9 in the head 5 of bracket 4 is such that said rod will be disposed at such an angle relatively to the engaging surface of the wheel or pulley 3 to cause the brake band to approach the latter when the fixed end of said brake-band is adjusted by the movement of the nut or block 7.

Having fully described our invention what we claim as new and desire to secure by Letters Patent, is—

1. The combination with a support adapted to be secured to a shaft and a wheel adapted to be mounted loosely on the shaft, of a bracket secured to said support, a nut movably mounted in said bracket, a rod having a threaded portion for moving said nut, an enlargement on said rod having a bearing in the bracket in rear of the nut, a clutch band encircling said wheel and connected at one end with said nut, and a lever pivotally mounted on the support and connected with the other end of the clutch band.

2. The combination with a support and a wheel, of a bracket secured to the support and provided with a lateral arm, a nut movable in said bracket, a rod mounted in the bracket and having a threaded portion for moving the nut, an enlargement on said rod having a bearing in the bracket in rear of the nut, a clutch band having one end connected with said nut, and a lever pivotally attached to the lateral arm of the bracket and connected with the other end of the clutch band.

3. The combination with a support and a wheel, of a bracket secured to said support and provided beyond the periphery of the latter with a slot, a nut movable in said slot, a rod mounted in the bracket and having a threaded portion passing through said nut, an enlargement on said rod having a bearing in the bracket in rear of the nut, a clutch band encircling said wheel and connected at one end with said nut, and a pivoted lever connected with the other end of said clutch band.

4. The combination with a support and a wheel, of a bracket secured to the support and projecting beyond the periphery thereof, a rod mounted in said bracket and having a threaded portion and an enlargement in rear of the threaded portion, said enlargement having a bearing within the bracket, a nut supported by the bracket and movable on said threaded rod forwardly of the enlargement on the latter, a pivoted lever, a clutch band encircling said wheel and connected at one end with said pivoted lever, and means connecting the other end of said clutch band with the nut carried by the bracket, said threaded rod being disposed tangentially relatively to the peripheral face of said wheel whereby, when the nut is moved in one direction by said threaded rod, the connection of the fixed end of the clutch band with the nut will be caused to approach the engaging surface of said wheel.

5. The combination with a support and a wheel, of a bracket secured to the support and provided with a slotted head, a rod mounted in said slotted head and having a threaded portion passing through the slot thereof, a nut movable in the slot of said head and having internal threads for the accommodation of the threaded portion of the rod, a fixed collar on said rod in rear of the threaded portion of the latter, to engage the rear wall of the slot in the head, a clutch band encircling said wheel, a bifurcated arm secured to the clutch band and connected to said nut at respective sides of the latter, a pivoted lever, and means connecting the other end of the clutch band with the pivoted lever.

6. The combination with a support and a wheel, of a bracket secured to said support and provided with a head having an elongated slot therein, a removable block closing one end of said slot, a rod mounted in the slotted head and having a threaded portion disposed in the slot of said head, a fixed collar on said rod to engage the head at one end of the slot therein, a nut mounted on the threaded portion of the rod and in the slot of the head, a clutch-band encircling said wheel, means connecting one end of said clutch-band with the nut in the slotted head, a pivoted lever, and means connecting the other end of said clutch-band with the pivoted lever.

In testimony whereof, we have signed this specification in the presence of two subscribing witnesses.

STEPHEN H. PITKIN.
FRANKLIN MOELLER.

Witnesses:
 HERBERT P. GLIDDEN,
 C. L. SWAISGOOD.